INVENTOR.
JAMES L. WHITTEN
BY George M Munshaw
ATTORNEY

June 18, 1940.      J. L. WHITTEN      2,205,182
AUTOMATIC CONTROL APPARATUS
Filed Feb. 8, 1939      5 Sheets-Sheet 2
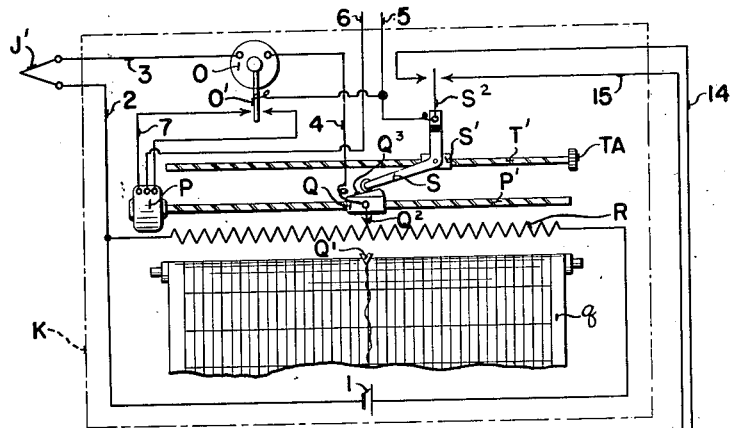
FIG. 2.
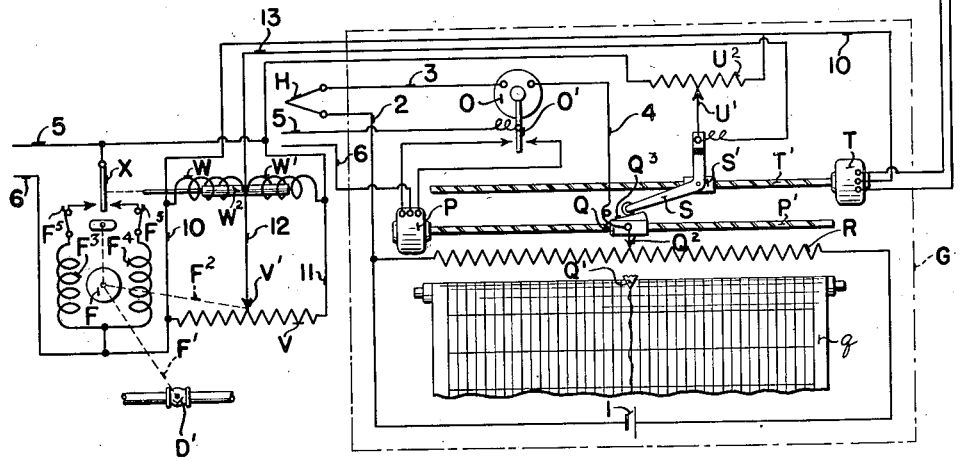
FIG. 3.
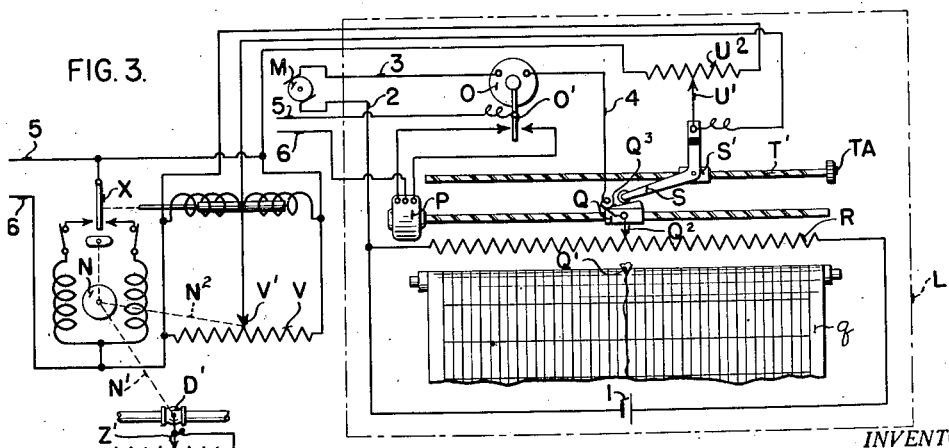
INVENTOR.
JAMES L. WHITTEN
BY *George M Umschang*
ATTORNEY.

INVENTOR.
JAMES L. WHITTEN

INVENTOR.
JAMES L. WHITTEN
BY George M. ...
ATTORNEY

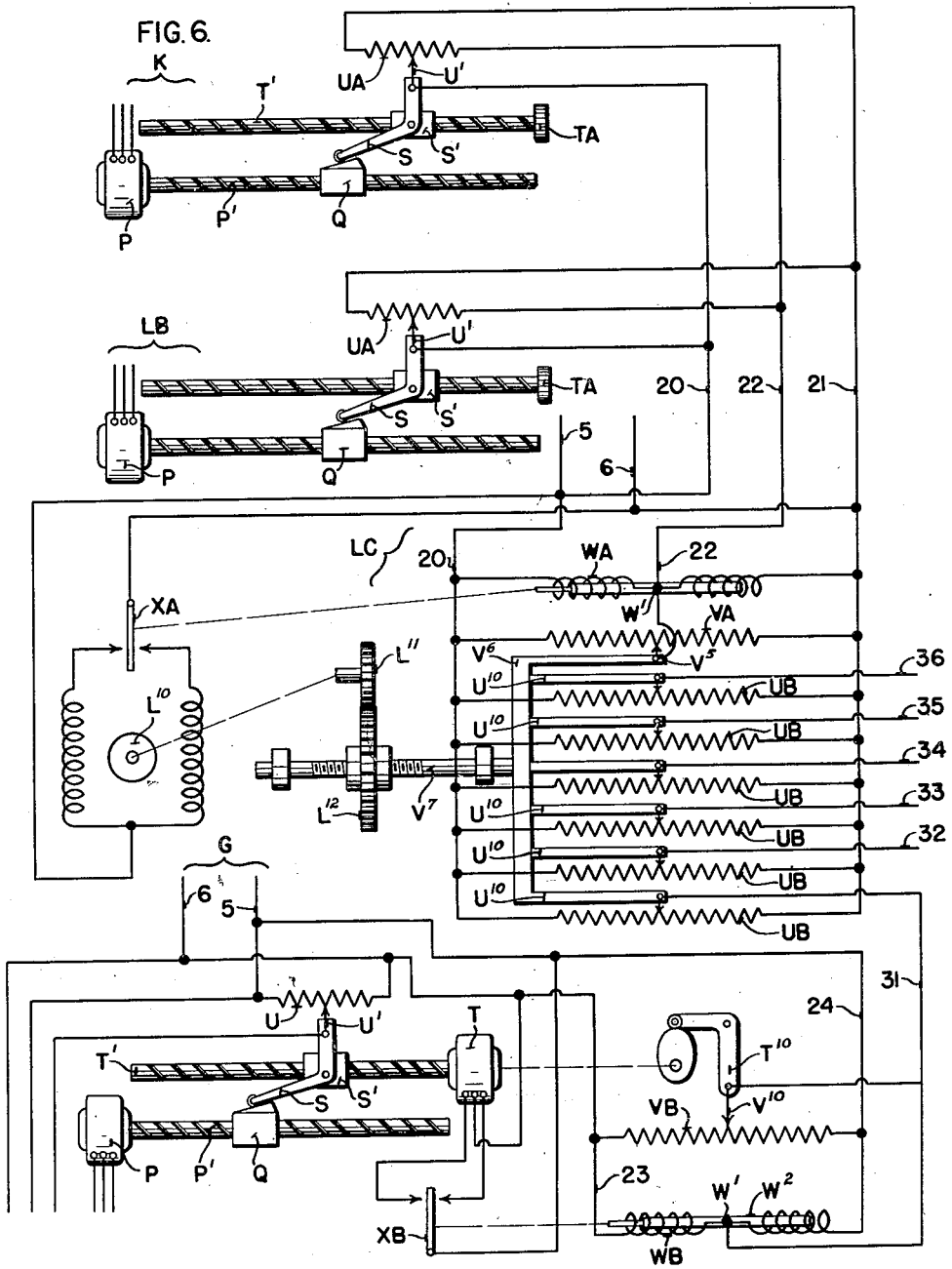

Patented June 18, 1940

2,205,182

UNITED STATES PATENT OFFICE 2,205,182

AUTOMATIC CONTROL APPARATUS

James L. Whitten, Rocky River, Ohio, assignor to The Brown Instrument Company, Philadelphia, Pa., a corporation of Pennsylvania Application February 8, 1939, Serial No. 255,231

8 Claims. (Cl. 263—8)

The general object of the present invention is to provide a novel and effective automatic control system for regulating the operation of furnaces of the type commonly called "normalizing" furnaces, employed to subject work pieces, such as metal strips in the course of their development from billets, to an annealing or "normalizing treatment."

A typical normalizing furnace comprises a horizontally elongated furnace chamber and a conveyor continuously or intermittently moving work pieces through the furnace in its longitudinal direction and ordinarily separating the furnace chamber into upper and lower portions. Such a furnace usually comprises a relatively short cooling section and a relatively long heating section delivering heated work pieces to the cooling section.

In the preferred form of the present invention, regulable heating units are distributed above and below the conveyor, and along the length of the heating section, which is thus divided into end to end regulable heating zones. In an advantageous construction, vertical partitions extending from the top and bottom walls of the furnace toward the conveyor, divide the heating section into compartments each including a heating unit.

My improved control system comprises a separate temperature measuring means for measuring the temperatures in each of the different heating zones, means for measuring the temperature at which the work pieces pass away from the heating section of the furnace, and means for measuring the conveyor speed, and control means combined with the different temperature and speed measuring means in such manner that the conveyor speed and the rates at which heat is supplied to the different heating zones are related so as to maintain an approximately constant and predetermined work piece temperature at the exit end of the heating section of the furnace, and to properly distribute the supply of heat to the different heating zones, all with little or no tendency to objectionable hunting.

For the attainment of the general object of the invention, the measuring and control means may be combined in various ways, though in the practice of the invention, the supply of heat to each heating zone is invariably made dependent, in part, upon the temperature in that zone, and in part, upon a second control condition dependent in part, upon a second control condition, which may be either the conveyor speed, or the heating section exit work temperature, or a joint function of the last mentioned temperature and the conveyor speed. When the supply of heat to each heating zone is made jointly dependent on the temperature in that zone and on the conveyor speed, the latter may be directly controlled by the heating section exit work temperature. When the last mentioned temperature and the temperature in each heating zone jointly control the supply of heat to said zone, the means for measuring the conveyor speed may advantageously be used in maintaining an approximately constant predetermined conveyor speed. When the supply of the heat to each heating zone is regulated, in joint response to the temperature in said zone, to the heating section exit work temperature, and to the conveyor speed, the latter may be manually controlled, and varied between limits to correspondingly vary the furnace operating rate or output.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Of the drawings:

Fig. 2 is a diagrammatic representation, on a larger scale and in more detail than Fig. 1, of two interlocked measuring and control instruments employed in Fig. 1;

Fig. 3 is a diagrammatic representation on a larger scale and in more detail than in Fig. 1, of the means employed in Fig. 1 for controlling the speed of the roller driving motor;

Fig. 6 is a diagram, on a larger scale and in more detail than Fig. 5, of a portion of the control apparatus employed in Fig. 5.

Figure 1:
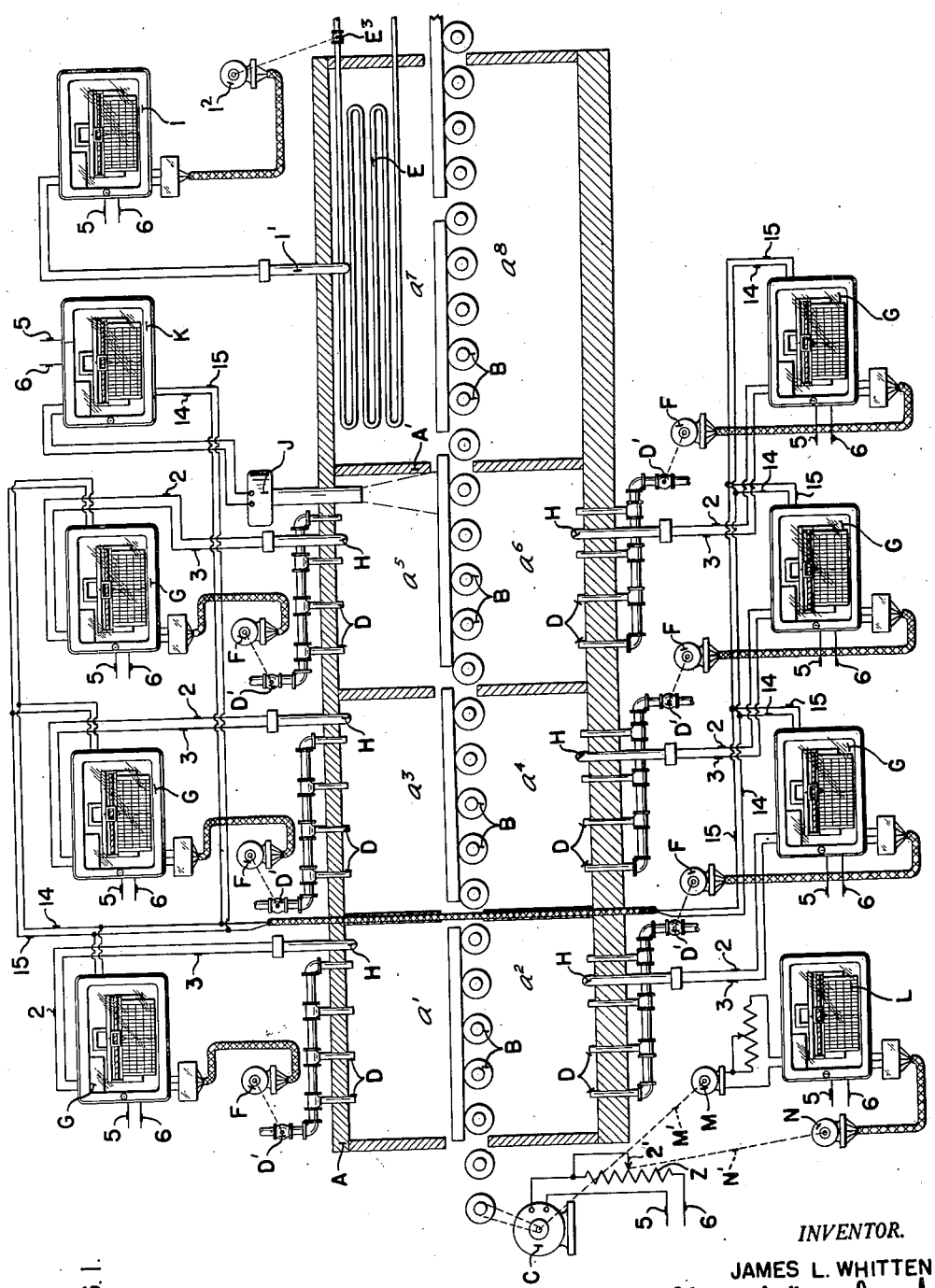
Fig. 1 is a diagrammatic representation of a normalizing furnace and one form of measuring and control apparatus associated therewith.

In the drawings, and referring first to the form of the invention shown in Figs. 1, 2 and 3, A represents a horizontally elongated normalizing furnace, divided into upper and lower portions by a metal strip or work piece advancing conveyor consisting of a plurality of rollers B, approximately midway between the furnace top and bottom walls, and having said portions divided by interior vertical partitions A′, into upper initial, intermediate and final heating compartments $a'$, $a^3$ and $a^5$, respectively, and into lower, initial, intermediate and final heating compartments, $a^2$, $a^4$ and $a^6$, respectively, beneath the compartment $a'$, $a^3$ and $a^5$. The conveyor rollers B are rotated by an electric driving motor C in the direction to advance the metal strips or work pieces successively past the initial, intermediate, and final heating compartments, and thence through a cooling section comprising upper and lower compartments $a^7$ and $a^8$, extending between the compartments $a^5$ and $a^6$, respectively, and the exit end of the furnace. The compartment contains a cooling device E, which receives a cooling fluid at a rate controlled by the adjustment of a valve $E^3$.

Each of the different compartments $a'$, $a^2$, etc., is heated by the combustion of fluid fuel, supplied to burners D therein through a control valve D', individual to that compartment. The valve D' constituting the heat regulating device for each compartment, is automatically adjusted by a corresponding measuring and control instrument G, which measures and effects corrections in accordance with the temperature of the thermocouple H or other heat temperature responsive device in the corresponding heating compartment. As hereinafter explained, in Fig. 1, each instrument G regulates the fuel supply to the corresponding heating compartment in joint response to the temperature in that compartment, measured by said instrument, and to the temperature at which the work pieces treated pass from heating section to the cooling section of the furnace. The last mentioned temperature is measured by a radiation pyrometer J shown as including a thermocouple J', and a measuring and control instrument K which measures the temperature of the thermocouple J'. In the form of the invention shown in Fig. 1, on a variation in the temperature of the couple J', the instrument K subjects each of the various instruments G, to a so-called control point adjustment, as is hereinafter explained.

As shown in Fig. 1, the conveyor motor C, operates a tachometer M of the electromagnetic generative type, through a shaft extension or other operating connection, M', and the speed of the motor is measured by a control instrument L, to which the terminals of the tachometer generator M are connected. The instrument L operates, as hereinafter described, to maintain the speed of the motor C approximately constant at a predetermined value, which may be manually adjusted as conditions make desirable.

The above mentioned measurements and control actions may be effected by the use of measuring and control apparatus of various forms. As shown in Figs. 2 and 3, the control instruments G, K and L, are each of the well known commercial, self balancing, potentiometric instrument type known as the "Brown potentiometer." As diagrammatically shown in Fig. 2, each instrument G comprises a galvanometer O, the deflections of which control the operation of a reversible motor P, rotating an elongated threaded shaft P'. The latter is in threaded engagement with a pen carriage Q, which, on a rotative movement of the motor P is moved longitudinally of the shaft P', in a direction dependent on the direction of rotation of the motor P. The pen carriage Q, supports a recording pin Q', and moves it across a record chart $q$, and supports a slider contact $Q^2$ which engages, and is moved by the pen carriage movements along the length of the slide wire resistor R of a potentiometric measuring circuit. The pen carriage Q also has a cam surface $Q^3$ which is engaged by a control lever S, and is inclined to angularly adjust said lever in accordance with the movements of the pen carriage. The lever S forms the actuator of the control mechanism for the motor F adjusting the fuel regulator D' for the heating compartment having its temperature measured by said instrument.

As shown in Fig. 2, the resistor R is connected in series with, and energized by a battery or other source of current I. One terminal of the resistor R is connected by a conductor 2 to one terminal of the corresponding thermocouple H, and the second terminal of the latter is connected by a conductor 3 to one terminal of the corresponding galvanometer O. The second galvanometer terminal is connected by a conductor 4 to the sliding contact $Q^2$. The thermocouple H and galvanometer O are thus connected in series with one another, and with the portion of the resistor R between the conductor 2 and the sliding contact $Q^2$, so that the potential drop in said resistor portion will oppose, or buck, the E. M. F. of the thermocouple. The pointer O' of the galvanometer is adapted to occupy its neutral position, or to deflect clockwise, or counterclockwise, accordingly as the voltage of the thermocouple H is respectively equal to, less than, or greater than the voltage drop in the portion of the resistor R between the contact $Q^2$ and conductor 2.

When said voltage drop exceeds the voltage of the thermocouple H, the galvanometer O energizes the motor for movement of the pen carriage Q to the left. Conversely, on an increase in the thermocouple voltage, relative to the said voltage drop, the motor P is energized for operation in the direction to give the pen carriage Q an adjustment to the right. The motor P, like the motors F and N, shown in more detail in Fig. 2, has three terminals, one of which is constantly connected to an electric supply conductor 6, while the cooperating electric supply conductor 5, which is connected to the galvanometer pointer O' is connected through the latter to the second terminal 7, of the motor P, when the galvanometer pointer deflects clockwise, and is connected to the third terminal, 8, of the motor P, when the galvanometer pointer deflection is in the counterclockwise direction. The clockwise and counterclockwise deflections of the pointer O', thus produce movements of the pen carriage Q to the right and left, respectively.

The above mentioned control lever S of the instrument G, is mounted on a support, or control table S', which in the type and form of instrument illustrated, is in threaded engagement with an elongated threaded shaft T', parallel with the shaft P', and forming a so-called control point adjusting member, which, as shown, is rotated by a motor T, the latter being automatically controlled by the instrument K as hereinafter described. The lever arm S, which carries a roller at its end engaging the inclined cam surface $Q^3$ of the pen carriage Q, carries a slider contact U' at its other end. The contact U' engages a slide wire resistor $U^2$, and is moved along the length of the latter, as the lever S is angularly adjusted by the pen carriage movements.

The angular adjustments of the lever S of the instrument G shown in Fig. 2, gives corresponding adjustment movements to the corresponding motor F, through control means of well known type. The latter, commonly referred to as a proportioning control system, comprises an electric bridge circuit which includes the resistor $U^2$.

Said bridge circuit is normally in balance, but is adapted to be unbalanced by each angular adjustment of the lever S, and is adapted, when unbalanced, to effect the operation of the motor F required to rebalance the bridge, and to give a corresponding adjustment to the corresponding valve D', through an operating connection F' between the motor and valve. In the bridge circuit shown in Fig. 2, the resistor $U^2$, a second slide wire resistor V, and a solenoid winding W, are connected in parallel with one another, between conductors 10 and 11. A potential difference is maintained between the conductors 10 and 11, as by their connection to electric supply conductors 5 and 6, respectively.

A contact V' in engagement with the resistor V is adjusted along the length of the latter by and in accordance with the direction of magnitude of rotative movement of the armature of the motor F, through an operating connection $F^2$. The solenoid winding W is connected at a point W' midway between its ends to the contact V' by a conductor 12, and is connected to the contact U', by a conductor 13. As will be apparent, a movement of the contact U' to the left, will increase the current flow in the portion of the winding W between the point W' and the conductor 10, relative to the current flow in the portion of said winding between the conductor 11 and point W'; and will thereby give movement to the left, as seen in Fig. 2, to an armature $W^2$ axially disposed in the winding W. The armature $W^2$, which assumes a position midway between the ends of the winding W, when the current flows in the two halves of the winding are equal, is moved to the right by an adjustment of the contact U' to the right, as seen in Fig. 2.

Each longitudinal movement of the armature $W^2$ adjusts a switch member X to energize one or the other of the field windings $F^3$ and $F^4$ of the motor F, depending on the direction of adjustment of the armature $W^2$, and thereby operate the motor in the direction to rebalance the proportional control system bridge, by adjusting the contact V' along the resistor V, as required to again equalize the current flows in the portions of the winding W at opposite sides of its midpoint W'. Since the valve D' is adjusted by and in accordance with the operation of the motor F, when the control bridge circuit is balanced and the motor F deenergized, the adjustment position of the valve D', will correspond to the position of the contact V' along the resistor V and the resistor thus serves as a followup resistor, to insure an extent of adjustment of valve D', in predetermined proportion to the extent of adjustment of the contact U', giving rise to the valve adjustment. As shown in Fig. 2, the energizing circuit provisions for the motor F include automatic limit switch provisions $F^5$, adapted to interrupt the operation of the motor F, on a predetermined maximum adjustment in either direction of the valve D'. As said provision may be and are conventionally shown as of well known type, they need not be further described herein.

The instruments K and G, are shown in Fig. 2, as exactly alike, except in respect to the means for angularly adjusting their respective shafts T', and in respect to the control means associated with their respective levers S. For the purposes of the present invention, the adjustment of the shaft T' of the instrument G is effected automatically by the instrument K in response to variations in the temperature of the thermocouple J' measured by the instrument K, while the shaft T' of the instrument K is adjusted by a device TA, manually operable or subject to manual control. As shown, the motor T is a reversible motor, like the previously described motors P and F, having a common terminal permanently connected to a supply conductor 6, and having one or the other of its second and third terminals, 14 and 15, connected to the cooperating supply conductor 5, on deflection in one direction or the other from a neutral position of switch contact $S^2$ carried by the lever S of the instrument K and permanently connected to the supply conductor 5.

The instrument L shown in Fig. 3, is exactly like the instrument G shown in Fig. 2, and controls the motor N through a proportioning control system, exactly like that through which the instrument G shown in Fig. 2 controls the corresponding motor F. The sliding contact V' of Fig. 3, is adjusted by an operating connection $N^2$ to the armature shaft of the motor N. The latter, through a separate operating connection N', adjusts a sliding contact Z' along a slide wire resistance Z connected in series with the motor C between the energizing supply conductors 5 and 6 connected to the latter, and thereby controls the speed of the motor C.

Figure 4:
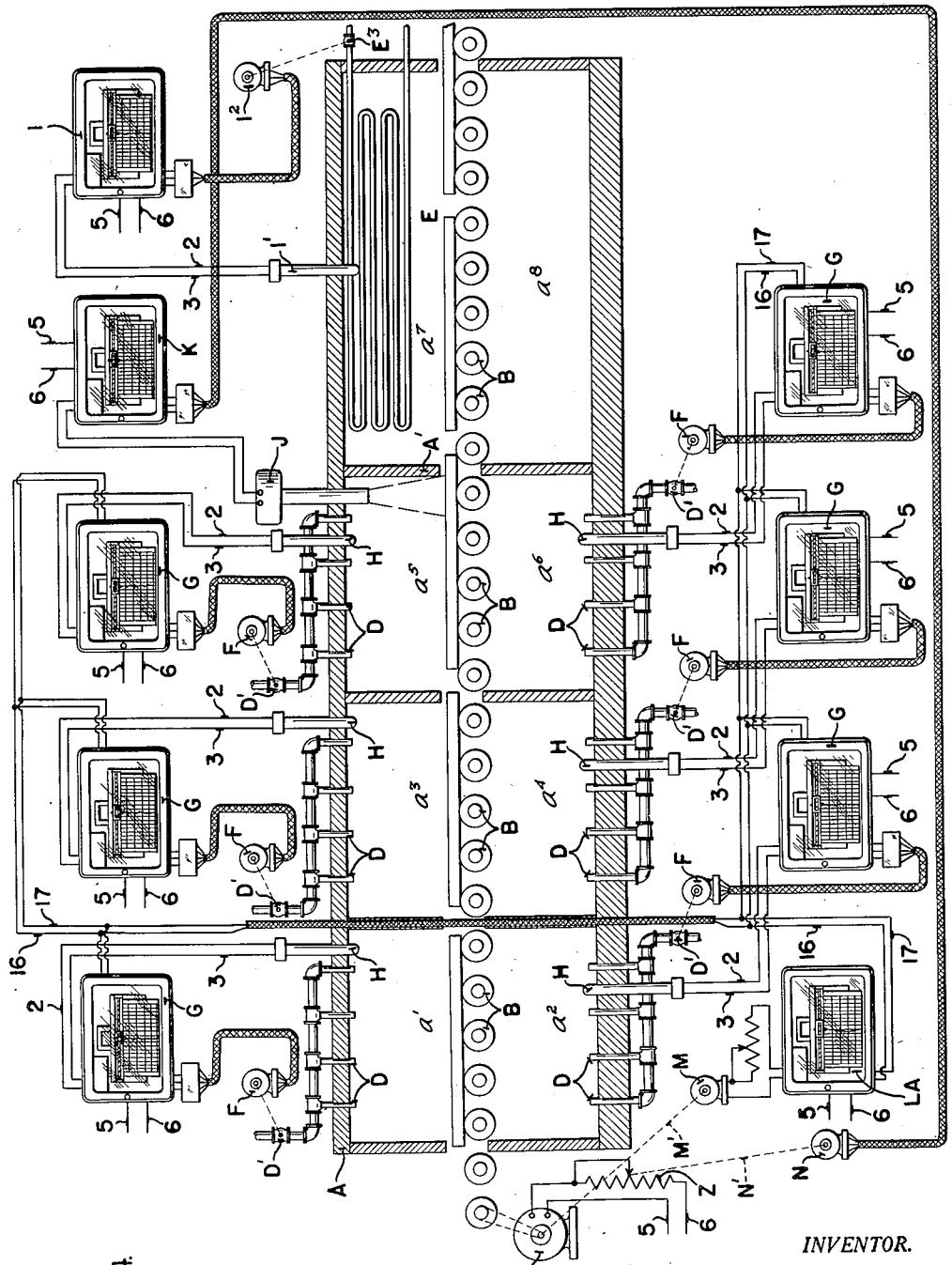
Figs. 4 and 5 are diagrammatic views taken similarly to Fig. 1, and each illustrating the different modification of the control apparatus shown in Fig. 1.
Figure 5:
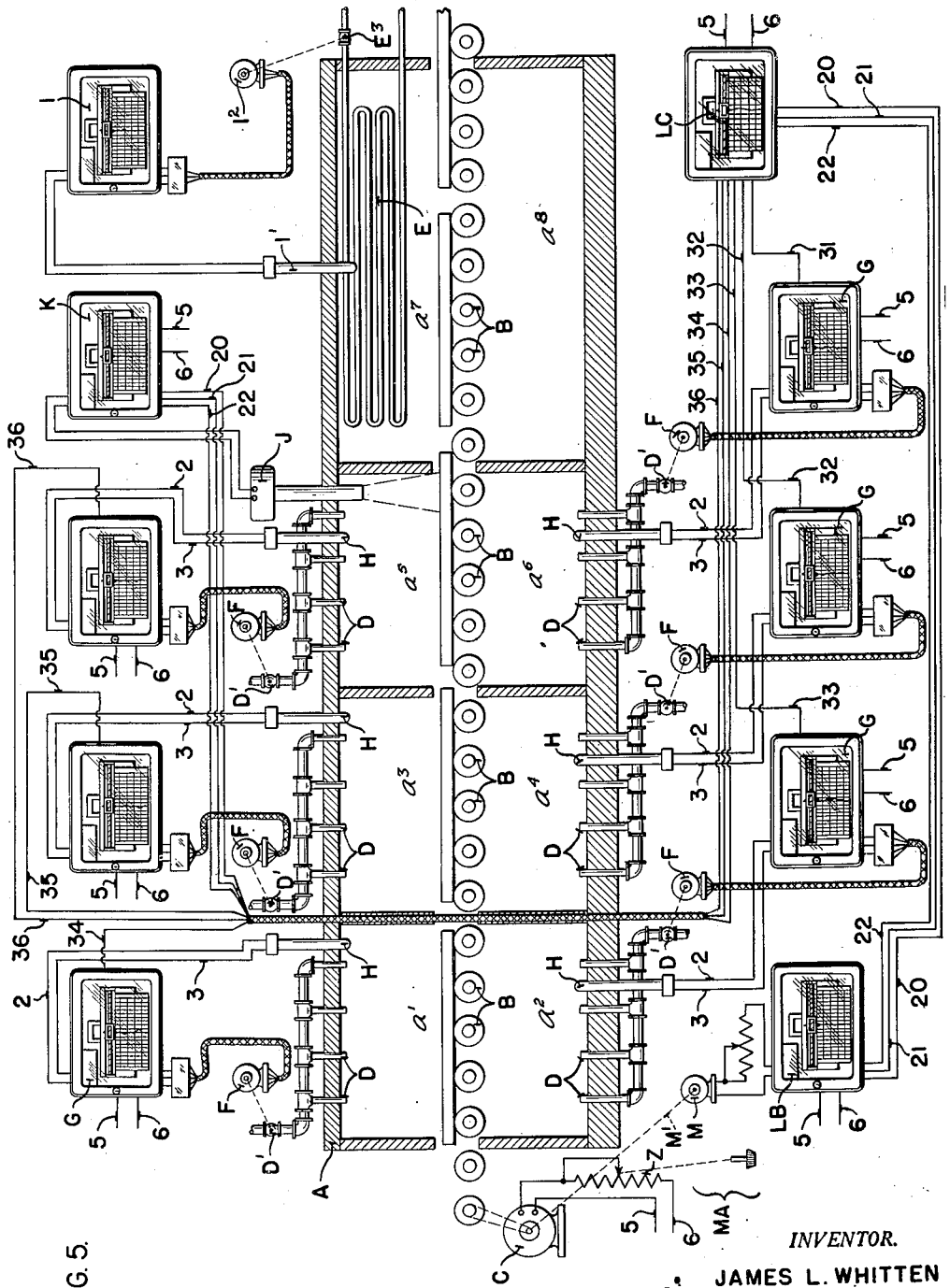

In the form of my invention shown in Fig. 1, as in those shown in Figs. 4 and 5, the supply of cooling fluid to the cooling coil E which as shown is located in the upper compartment $A^7$ of the cooling section of the furnace, is automatically regulated by means measuring and tending to maintain an approximately constant cooling zone temperature. The means diagrammatically shown for the purpose, comprise a thermocouple I' subject to the cooling zone temperature, an instrument I which may be exactly like the instrument K and L, a motor $I^2$ controlled by the instrument I and adjusting the valve $E^3$ to increase or decrease the rate at which the cooling fluid is supplied to the cooling coil E, as the temperature of the thermocouple I' increases above, or falls below the predetermined normal value. The motor $I^2$ may be controlled by the instrument I through control provisions identical with those through which the instrument K controls the motor T of each of the instruments G.

In the operation of the apparatus shown in Figs. 1, 2, and 3, the tachometer M and instrument L serve to maintain the speed of the motor C, and thereby the rate of travel of the metal strips through the furnace at an approximately constant predetermined value. The predetermined or normal speed maintained, determines the maximum furnace output, or operative capacity which may be varied, when desirable, by manual rotation of the device TA of the instrument I. With a constant rate of work travel through the furnace, the total amount of fuel supplied to the different burners D, needs to be adjusted by the primary control instrument K of the system, only as required to counteract for such changes in operating conditions, as changes in work piece dimensions and weights, changes in the temperature at which the work pieces enter the normalizing furnace, changes in composition of the gaseous or other fluid fuel mixtures supplied to the burners D, and changes in the heat radiation losses from the furnace. Under normal conditions, all of the changes which thus need to be compensated for by the action of the instrument K, occur slowly, and require relatively small corrective control actions. As will be apparent, also, under normal conditions, the relative adjustment of the different valves D', which the corresponding instruments G need to effect to maintain the proper distribution of the fuel supplied to the different heating compartments, will be small in amount, and infrequent in occurrence. The control system shown in Fig. 1, is thus well adapted to maintain a desirable and close control of the temperature at which the work leaves the heating section of the furnace, and of the relative temperatures maintained in the different heating compartments, without risk of objectionable hunting.

While each thermocouple H is directly responsive to a furnace temperature, as distinguished from a work temperature, the measuring means including and associated with each thermocouple H, provides an indirect measure of the work temperature and is practically preferable for its intended purpose, to measuring means like that including the meter K and radiation pyrometer J adapted, directly measuring the work temperature. In the furnace shown, in Fig. 1, each of the upper compartments $a'$, $a^3$ or $a^5$, in conjunction with the immediately subjacent compartment $a^2$, $a^4$ or $a^6$, respectively constitutes a heating zone or portion of the heating section of the furnace, in which the temperature condition maintained which may be and in normal practice is different from that maintained in the zones formed by the other compartments. While in most cases, at least, the segregation of the zones by the partition walls A' is practically desirable such segregation is not essential to the attainment of all of the advantages of the present invention.

In Fig. 4, I have illustrated an embodiment of the invention differing specifically from that shown in Fig. 1, only in two respects. The instrument LA of Fig. 4 which in association with the tachometer M measures the speed of the conveyor motor C, unlike the instrument L of Figs. 1 and 3, has no direct controlling effect on the conveyor speed, but is arranged to subject each of the instruments G to control setting point adjustments on variations in the conveyor speed, in a manner exactly similar to that in which the instrument K of Fig. 1 adjusts the instruments G on variations in the temperature at which the work pieces leave the heating section of the furnace. In Fig. 4, control circuit conductors 16 and 17 connect the meter LA to the meters G, as the conductors 14 and 15 of Fig. 1 connect the instrument K to the instruments G.

The second difference between the arrangements of Figs. 1 and 4, is that in Fig. 4, the instrument K, which measures the exit work temperature, is employed to energize the conveyor speed control motor N through control conductors 18 and 19, in a manner which may be exactly like that in which the instrument K of Figs. 1 and 2 is arranged to control the energization of the control setting point adjustment motor T of each instrument G.

In Figs. 5 and 6, I have illustrated an embodiment of my invention differing from that shown in Fig. 1, in that the instrument K, measuring the exit work temperature, and the instrument LB, measuring the speed of the conveyor motor C as in Fig. 1, are associated with the various instruments G, to make the regulating action of each instrument G a joint function of the exit work temperature, the conveyor speed and the temperature of the heating compartment or portion of the heating section of the furnace with which the instrument G is associated. In the arrangement shown in Figs. 5 and 6, the conveyor speed may well be regulated by a simple manually adjustable controller MA for the motor C, since the control effects impressed on the instruments G by the instrument LB, compensate for variations in the conveyor speed, and make precise control of that speed less important that it is with the arrangements shown in Figs. 1 and 4.

As those skilled in the art will recognize, the instruments LB, K and G of Figs. 5 and 6, may be associated or combined in various ways to produce their intended conjoint control effects. In the particular arrangement shown in Figs. 5 and 6, each of the instruments K and LB includes a resistor UA and a control contact U' adjusted along said resistor in accordance with variations in the value of the quantity measured by the instrument. The two resistors UA, a follow-up resistor VA, and a solenoid winding WA are connected in parallel between the energizing conductors 20 and 21, of a proportioning system bridge circuit, and respectively connected to current supply conductors 5 and 6. When a movement of the contact U' of either instrument K or LB, unbalances the bridge including the resistors UA, the bridge may be automatically rebalanced by the adjustment of a contact $V^5$ engaging the follow-up resistor VA. The rebalancing adjustments of the contact $V^5$ are effected by the operation of a motor $L^{10}$ included in a control unit or assembly LC, and controlled by a switch XA connected to the armature $W^2$ axially disposed in the solenoid winding WA, just as the motors F and N shown in Figs. 2 and 3 are controlled by the corresponding switches X and armatures $W^2$.

The midpoint W' of the solenoid WA, the contact $V^5$, and the control contacts U' of the instruments K and LB are connected, and have their potentials equalized, by a conductor 22. As shown in Fig. 6, the motor $L^{10}$ adjusts the contact $V^5$ through means comprising a cross head $V^6$, to which the contact $V^5$ is connected through an insulation joint, and which has a threaded spindle $V^7$ adapted to be adjusted in the direction of its length by the rotation of a gear wheel $L^{12}$ held against movement in the direction of the length of the spindle $V^7$, and in mesh with the gear $L^{11}$ carried by the armature of the motor $L^{10}$. The gear $L^{12}$ is formed with a threaded axial passage which receives, and is in threaded engagement with the spindle $V^7$. The gear member $L^{12}$ thus forms a nut adapted when rotated to give the spindle $V^7$ a longitudinal adjustment.

The position of the contact $V^5$ along the follow-up resistor VA is a joint function of the positions of the contacts U' of the instruments K and LB relative to the corresponding resistors UA. On each change in position of the contact $V^5$, the device LC effects a corresponding control point adjustment in each of the different fuel valve controlling instruments G. To this end, as diagrammatically shown in Fig. 6, the cross head $V^6$ supports through insulation joints, a plurality of contacts $U^{10}$, one for each instrument G of the control system shown in Fig. 5, and each engaging a corresponding individual resistor UB. Each resistor UB is connected in parallel with another resistor VB and with a solenoid winding WB, in a proportioning system bridge circuit, individual to the corresponding control instrument G. Each of said resistors VB and windings WB may be mounted within the casing of the corresponding instrument G. The mid point W' of the winding WB, and the slider contact $V^{10}$ engaging the resistor VB of each instrument G, are connected to the corresponding slider contact $U^{10}$ of the control unit LC, by a corresponding one of the conductors 31, 32, 33, 34, 35 and 36. In Fig. 6 the instrument G bridge circuit including the conductor 31, is the only one fully illustrated.

As shown in Fig. 6, the resistors UB are connected in parallel between the bridge energizing conductors 20 and 21, but as will be apparent, the resistors UB are not operative elements of the proportioning system bridge circuit including the two resistors UA, the resistor VA and the winding WA. The resistors VB and WB might also be connected between the same conductors 20 and 21, but as shown in Fig. 6 they are connected between conductors 23 and 24, energized by supply conductors 5 and 6 of the same supply system energizing the conductors 20 and 21.

While a change in the relative current flows in the two halves of the winding WA, results in corresponding adjustments of the contact $V^5$ and each of the contacts $U^{10}$, the adjustments of the contacts $U^{10}$ have no effect on the balance of the bridge circuit including the winding WA and the resistors UA and VA. Furthermore, the adjustment of each contact $U^{10}$ along the corresponding resistor UB, disturbs the balance only of the bridge circuit including the particular contact $V^{10}$ to which the said contact $U^{10}$ is connected by the corresponding one of the conductors 31, 32, 33, etc. As shown in Fig. 6, each contact $V^{10}$ is adjusted by the control point adjusting motor T of the corresponding instrument G, and the operation of said motor is controlled through a switch XB by the armature $W^2$ associated with the corresponding bridge winding WB, just as the motors F and N of Fig. 2 are controlled. As shown the motor T adjusts the contact $V^{10}$ through an operating connection including a rocking arm $T^{10}$.

As will be apparent from the foregoing, the different instruments G tend by their responses to variations in the temperatures which they respectively measure, to maintain a desired and predetermined distribution of the heat supplied to the different compartments or portions of the heating section. The instrument LB exerts a control point setting adjustment effected on each instrument G, which minimizes the effect of variations in the conveyor speed upon the exit work piece temperature. The control point setting adjustment action of the instrument K, minimizes the tendency to work piece exit temperature drift, or variations, as a result of changes in operating conditions, and lack of calibration, or adjustment, of the instruments LB and G, in suitable accordance with the prevailing operating conditions.

The invention in all of the forms illustrated, is characterized not only by the desirable character of the general control action and effect, resulting, however, in the manner in which the various quantity measurements and control operations are interrelated, but also by the fact that the control apparatus required may be relatively simple, and may consist in whole, or in major part, of control instruments and regulating devices of well known and desirable commercial types and forms.

While in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. The combination with the heating section of a furnace of the type described and conveyor means for moving work pieces through said section, of separate regulable heating means for different portions of said section, and means for regulating each of said heating means in joint accordance with the temperature in the corresponding portion of the heating section, and with the temperature at which the work pieces pass away from said heating section.

2. The combination with the heating section of a furnace of the type described, and conveyor means for moving work pieces through said section, of separate regulable heating means for different portions of said section, a separate means for measuring the temperature in each of said portions, means for measuring the temperature of the work pieces passing away from the heating section, and means for regulating each of said heating means in joint accordance with the last mentioned temperature and with the temperature in the corresponding portion of the heating section.

3. The combination with a furnace having an elongated pathway for work pieces to be heated in said furnace, conveyor means for moving work pieces along said pathway, separate regulating devices respectively associated with different portions of the furnace distributed along said pathway and each adjustable to regulate the supply of heat to the corresponding furnace portion, a separate means for measuring the temperature in each of said furnace portions, means for measuring the temperature of the work pieces passing away from said furnace portions, means for measuring the conveyor speed, and means through which one of the two last mentioned measuring means regulates the conveyor speed, and through which the other cooperates with the means for measuring the temperature in each furnace portion to control the adjustment of the device regulating the heat supply to that furnace portion.

4. The combination with a furnace having an elongated pathway for work pieces to be heated in said furnace, conveyor means for moving work pieces along said pathway, separate regulating devices respectively associated with different portions of the furnace distributed along said pathway and each adjustable to regulate the supply of heat to the corresponding furnace portion, a separate means for measuring the temperature in each of said furnace portions, other means for measuring the temperature of the work pieces passing away from said furnace portions, means for measuring the conveyor speed, and means through which the last mentioned measuring means regulates the conveyor speed, and means through which said other means cooperates with the means for measuring the temperature in each furnace portion to control the adjustment of the device regulating the heat supply to that furnace portion.

5. The combination with a furnace having an elongated pathway for work pieces to be heated in said furnace, conveyor means for moving work pieces along said pathway, separate regulating devices respectively associated with different portions of the furnace distributed along said pathway and each adjustable to regulate the supply of heat to the corresponding furnace portion, a separate means for measuring the temperature in each of said furnace portions, other means for measuring the temperature of the work pieces passing away from said furnace portions, means for measuring the conveyor speed, and means through which the last mentioned measuring means cooperates with the means for measuring the temperature in each furnace portion to control the adjustment of the device regulating the heat supply to that furnace portion, and means through which said other means regulates the conveyor speed.

6. The combination with a normalizing furnace heating section, conveyor means for moving work pieces through said section, regulating devices separately associated with different portions of said section and each adjustable to regulate the supply of heat to the portion with which it is associated, means for measuring the temperature in each of said portions, means for measuring the temperature of the work pieces passing away from the heating section, means for measuring the conveyor speed, and means through which each of the two last mentioned measuring means cooperates with the means for measuring the temperature in each portion in effecting regulating adjustments of the device regulating the heat supply to that portion.

7. The combination with a furnace comprising a heating section and a conveyor for moving work pieces through said section in the longitudinal direction thereof, of measuring and control instruments respectively associated with portions of the heating distributed along the length of the latter and each comprising a member adapted to deflect in accordance with the temperature in the portion of the heating section with which the instrument is associated, and each comprising a control table and a reversible electric motor for adjusting said control table longitudinally of the path of deflection of the said member, a measuring and control instrument for measuring the temperature of work pieces passing through and away from said heating portions, and electrical control means through which the last mentioned instrument controls the operation of the said motor of each of the first mentioned instruments, and proportioning system means associated with each of the first mentioned instruments for regulating the heat supply to the portion of the furnace with which that instrument is associated and including a bridge circuit comprising a resistor and a contact engaging said resistor and adapted to be moved along the length of the latter by and in accordance with relative movements of the deflecting member and control table of the instrument.

8. The combination with a furnace comprising an elongated heating section and a conveyor for moving work pieces through said section in the longitudinal direction thereof, of measuring and control instruments respectively associated with portions of said heating section distributed along the length of the latter and each comprising a member control table and reversible motor, said member being adapted to deflect in accordance with the temperature in the heating section portion with which that instrument is associated, said motor being adapted to adjust said control table longitudinally of the path of deflection of said member, an instrument measuring the temperature of work pieces passing through and away from said heating portions, and instrument measuring the conveyor speed, control means through which each of the two last mentioned instruments jointly control the operation of the said motor of each of said measuring and control instruments, and a proportioning system means associated with each measuring and control instrument for regulating the heat supply to the portion of the furnace with which the instrument is associated and including a bridge circuit comprising a resistor and a contact engaging said resistor and adapted to be moved along the length of the latter by and in accordance with relative movements of the instrument deflecting member and control table.

J. L. WHITTEN.